United States Patent [19]

Chumley

[11] Patent Number: 5,735,304
[45] Date of Patent: Apr. 7, 1998

[54] RAINWATER COLLECTION AND DISTRIBUTION APPARATUS AND METHOD

[76] Inventor: William M. Chumley, 3303 Green Pond Rd., Woodruff, S.C. 29388

[21] Appl. No.: 645,627

[22] Filed: May 14, 1996

[51] Int. Cl.$^6$ .................................................. E04D 13/08
[52] U.S. Cl. ..................... 137/15; 137/236.1; 137/357; 137/561 A; 52/16
[58] Field of Search ........................... 137/356, 357, 137/561 A, 236.1; 52/16

[56] References Cited

U.S. PATENT DOCUMENTS

| | | | |
|---|---|---|---|
| 3,714,962 | 2/1973 | Sauer et al. | 137/236.1 |
| 3,874,596 | 4/1975 | Baxter | 137/236.1 |
| 4,161,186 | 7/1979 | Sitarz | 137/357 |
| 4,620,817 | 11/1986 | Arshing | 52/16 |
| 4,982,533 | 1/1991 | Florence | 52/16 |
| 5,195,284 | 3/1993 | Florence | 52/16 |

*Primary Examiner*—A. Michael Chambers
*Attorney, Agent, or Firm*—Ralph Bailey

[57] ABSTRACT

Collection boxes and method for distributing run-off water utilize upright sides (A) with an open top for positioning at ground level with an entrance connection (B) for receiving an underground pipe, a bottom (C) communicates with a drainage opening (D) for avoiding standing water. An upright unobstructed passageway having a cross-section greater than the cross-section of the entrance connection for the pipe extends above the connection to avoid turbulence in upwardly rising run-off water, and a cover (E) permits water to overflow over a surrounding area carrying with it trash from the box. The boxes are preferably stacked or nested for conserving space during shipment.

16 Claims, 5 Drawing Sheets

RAINWATER COLLECTION AND DISTRIBUTION APPARATUS AND METHOD

BACKGROUND OF THE INVENTION

This invention relates to apparatus and method for inexpensively and effectively moving rainwater from gutter downspouts away from the foundation of a structure while conserving use of the water and avoiding discharge through unsightly exposed ends of corrugated pipes.

The problem of disposing of rainwater run-off from gutters and the like has persisted despite efforts to collect and distribute the water. For many years rainwater was collected in cisterns beneath dwellings and other structures for use in household operations. When the use of cisterns was discontinued and with the advent of gutters and downspouts, efforts to dispose of the water flowing at high velocity from the downspouts has included the use of collection tanks with a pump and distribution system such as illustrated in U.S. Pat. No. 4,934,404. U.S. Pat. No. 4,161,186 illustrates the use of an upright box including a hollow cylinder having an opening for receiving a pipe in a side wall utilizing a central tubular guide positioned by a spider for carrying a depending guide stem of a disk cover. Such a construction is expensive and inefficient in operation, inducing turbulence as run-off water rises. U.S. Pat. No. 4,620,817 illustrates the use of an upright box which receives water from a run-off collection system through a bottom and having a closed cover forcing the water through a perforated side of the box. The tank and collection boxes are of such configuration as to be expensive and bulky in shipment since they occupy a large volume of space in shipping containers.

A less expensive rainwater handling system includes splash blocks placed directly beneath the downspouts to reduce erosion. However, the accumulation of water adjacent the foundation of a building as results from the use of splash blocks produces many problems so that it is desirable that the run-off be directed away from the foundation, usually for a substantial distance. In directing run-off water away from the structure, corrugated plastic pipes have often been utilized wherein the pipes are connected at one end to the downspout with placement underground leading away from the structure and rising above ground resulting in discharge of the water in a high velocity stream often toward a drain to a sewer system or toward someone else's property, always producing problems.

In addition to producing problems of erosion and unsightly pipe ends, accumulations of roofing material discharged with water often stain a lawn or area of discharge whereas trash such as leaves, pine needles, etc. gather in unsightly accumulations. Moreover, the run-off water is wasted.

The invention hereof differs from the usual catch basin because flow is collected in catch basins so that lines lead away from rather than into the catch basin. This is also true of septic tanks which are provided for another purpose.

The prior art is further exemplified by U.S. Pat. Nos. 2,763,281, 3,542,055, 3,771,968, 3,833,177, 4,034,421, 4,161,186, 4,269,352, and 4,726,151.

SUMMARY OF THE INVENTION

Accordingly, it is an important object of the present invention to provide a system for collecting rainwater run-off and the like and conducting same underground away from the foundation of a structure to upright boxes wherein the velocity of the liquid flow is reduced and with less turbulence. The water which is thus collected overflows from the box and is distributed so as to spread outwardly therefrom at low velocity upon the ground and adjacent such areas as to be useful in irrigation.

Another important object of the invention is to provide a box for collecting rainwater which is mounted flush with the turf for removing trash together with the water which overflows from the box, while remaining water is later permitted to drain from the box so as to avoid standing water.

Another object of the invention is to provide a system of evenly distributing rainwater run-off over a large area while providing an imperforate cover for the system when not in use to permit walking or riding over the box and excluding pests such as rodents and the like from entering the box and pipes.

Another object of the invention is to conserve the use of water for collecting the run-off permitting lawn use in adjacent areas while avoiding the discharge of water at high velocity upon adjacent property.

Another important object of the invention is to solve the run-off problem inexpensively avoiding the use of unattractive exposed and easily damaged pipe ends with minimal use of personnel through the use of inexpensive material in novel combination and construction.

The cover for the box should be such as to permit water and trash to flow out of the box as the rainwater overflows leaving fine particles such as the roof of a structure in the box for removal upon regular cleaning.

Another important object of the invention is to reduce cost in shipping by providing structure for stacking and nesting the boxes to result in reduced volume.

The invention has been described in the context of handling rainwater from gutter downspouts but many other uses may be found for overflow and distribution boxes constructed for use in accordance with the invention.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate apparatus for receiving and distributing rainwater as from gutter downspouts utilizing at least one length of pipe suitable for attachment on one end to a downspout and for burial in the ground for carrying run-off water away from a building structure underground to an upright box having a side A with an open top positionable substantially at ground level. At least one entrance passageway B is provided in the side of the box for connecting a discharge end of the pipe thereto. A bottom C is provided for the box. An opening D communicates with a lower portion of the box for permitting water collected in the box to drain sufficiently for avoiding objectionable standing water. A cover member E is provided for the box for permitting water collected in the box to flow upwardly and out of the top of the box when the box has collected sufficient water to overflow. An unobstructed passageway is provided in the box above the entrance passageway permitting a free flow of water rising in the box and overflowing out of the top with reduced turbulence and carrying leaves and related trash out of the box.

Figure 1:
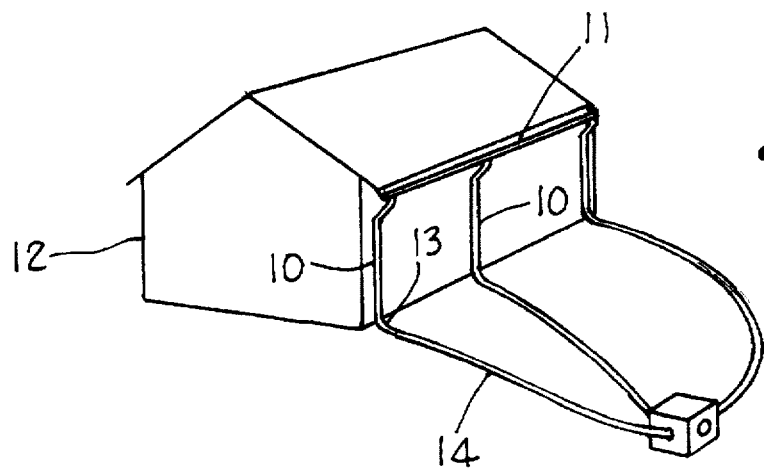
FIG. 1 is a perspective view schematically illustrating the collection of rainwater run-off from the downspouts on a building structure in distribution boxes constructed in accordance with the invention.
Figure 2:
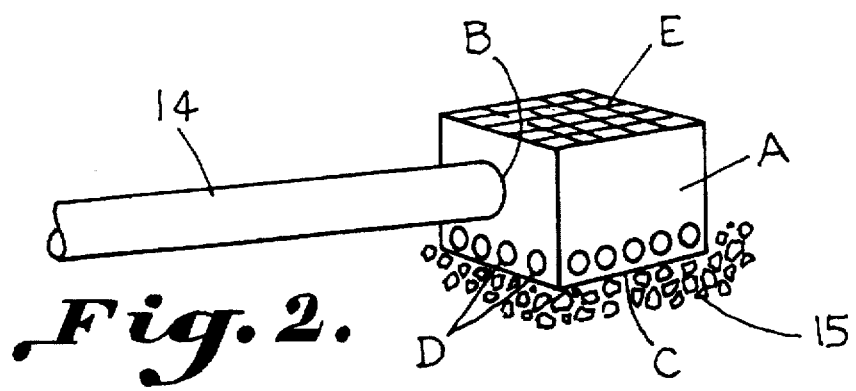
FIG. 2 is a perspective view further illustrating a modified collection box constructed in accordance with the invention having a single entrance for run-off water in a side of the box.
Figure 9:
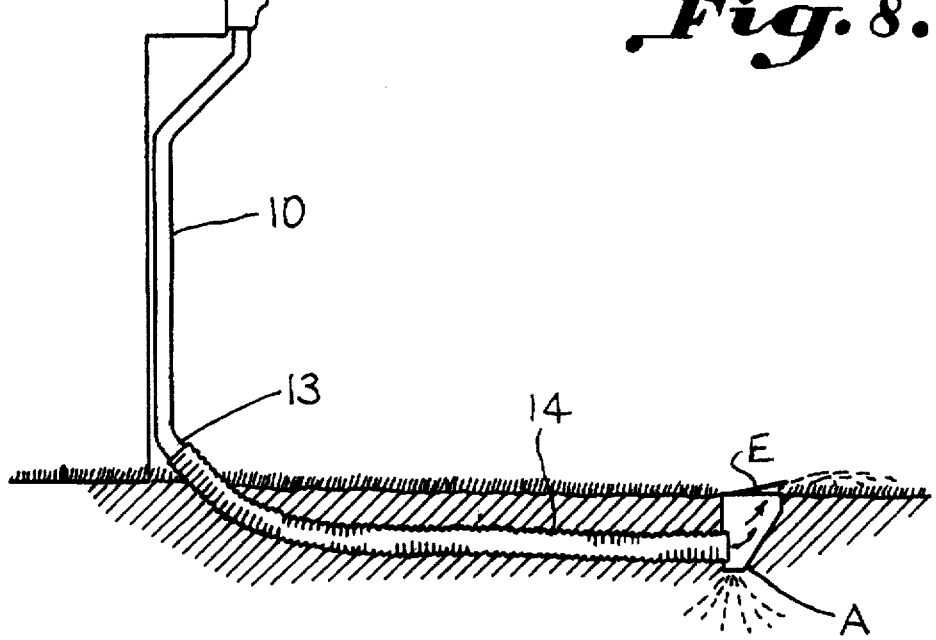
FIG. 9 is a schematic elevation illustrating the placement of distribution boxes such as shown in FIG. 8 to receive run-off water from the downspouts of a building.

Referring more particularly to FIGS. 1 and 9, the downspouts 10 are illustrated as receiving rainwater from gutters 11 carried in a customary manner upon building structures 12. The downspouts have an outwardly turned end 13 for connection to the usual corrugated pipe 14. FIG. 2 illustrates a distribution box having sides A forming a generally rectangular cross-section. The opening B is illustrated as being circular for snugly receiving an end of the corrugated pipe 14. The box has a suitable bottom C. The box communicates through openings D adjacent the bottom so as to permit drainage avoiding standing water in the box. The perforations or openings serve as a passageway and gravel is illustrated as at 15 surrounding the box to facilitate drainage and positioning of the box.

Figure 3:
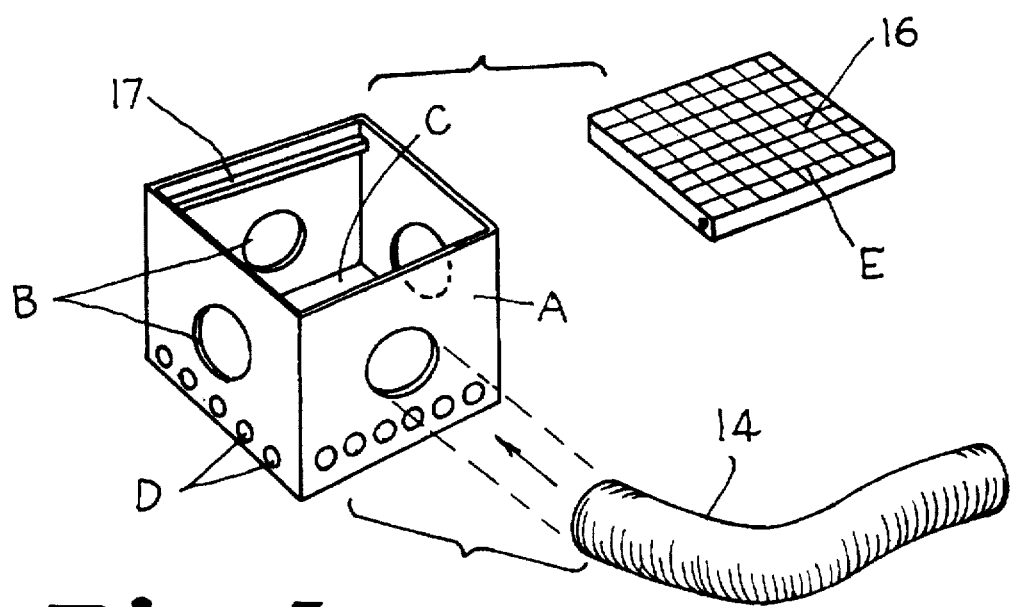
FIG. 3 is an enlarged perspective view of a collection box constructed in accordance with a form of the invention wherein a box receives multiple pipes for a run-off leading from the downspouts.

FIG. 3 illustrates a modified form of the invention wherein a number of openings B are carried in a multi-faceted box. The cover E is illustrated in the form of a grate 16 having suitable opening therein to permit water to overflow therethrough. The box has opposed ledges 17 to support the grating 16.

Figure 4:
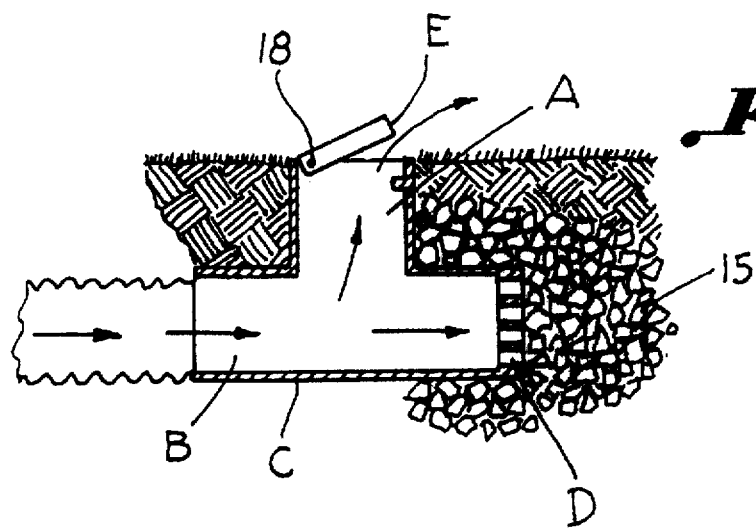
FIG. 4 is a sectional elevation illustrating a modified form of the invention wherein an opening passageway is provided in an upright side of a circular distribution box in accordance with a modified form of the invention wherein a perforated end provides openings adjacent a bottom of the box for drainage avoiding standing water in the box.
Figure 5:
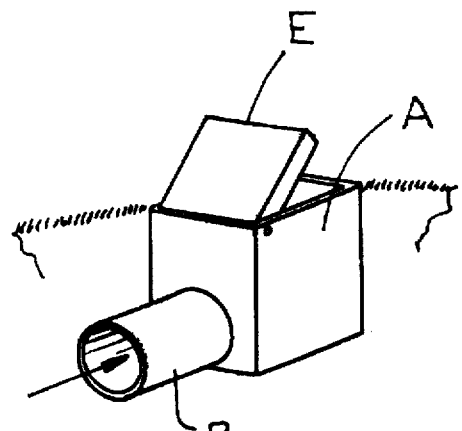
FIG. 5 is a perspective view further illustrating the modified form of the invention illustrated in FIG. 4.

FIGS. 4 and 5 illustrate a distribution box constructed in accordance with a modified form of the invention wherein a circular cover E is pivoted as at 18. The pivot point is preferably adjacent a side edge of the box although other positioning may also be utilized so long as an upward flow of run-off water is maintained so as to carry trash with it. Gravel 15 is illustrated as being positioned on an exit passageway from the box which is opposite from the entrance passageway B. In this manner entrancing water will lose its velocity and at the same time keep the outlets open for drainage purpose.

Figure 6:
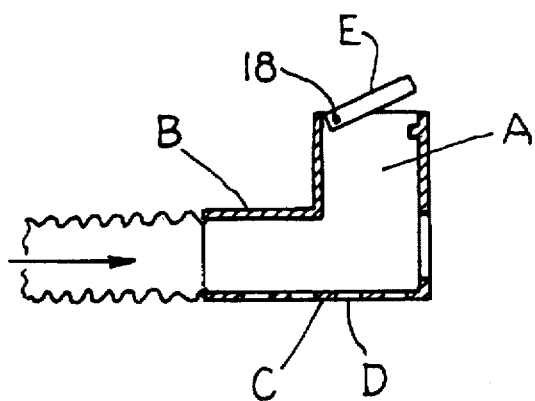
FIG. 6 is a longitudinal, sectional elevation of a distribution box constructed in accordance with a modified form of the invention wherein an unobstructed flow passage is provided in circular configuration affording an opening for a distribution pipe.
Figure 7:
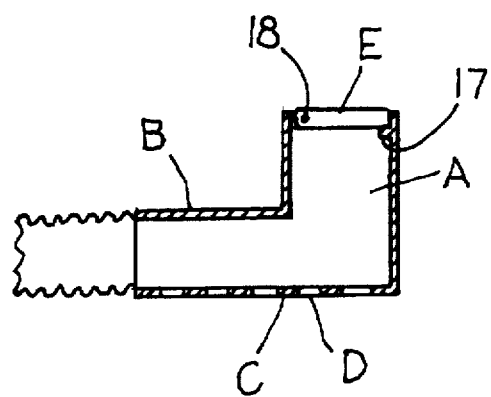
FIG. 7 is a side elevation of the embodiment of FIG. 6 further illustrating a pivotal top in closed position.

FIGS. 6 and 7 illustrate a modified form of the invention wherein the cover E is pivotally connected as at 18 and has an opposite edge resting on a ledge or stop member 17. Openings D are positioned in the arcuate bottom of the box.

Figure 8:
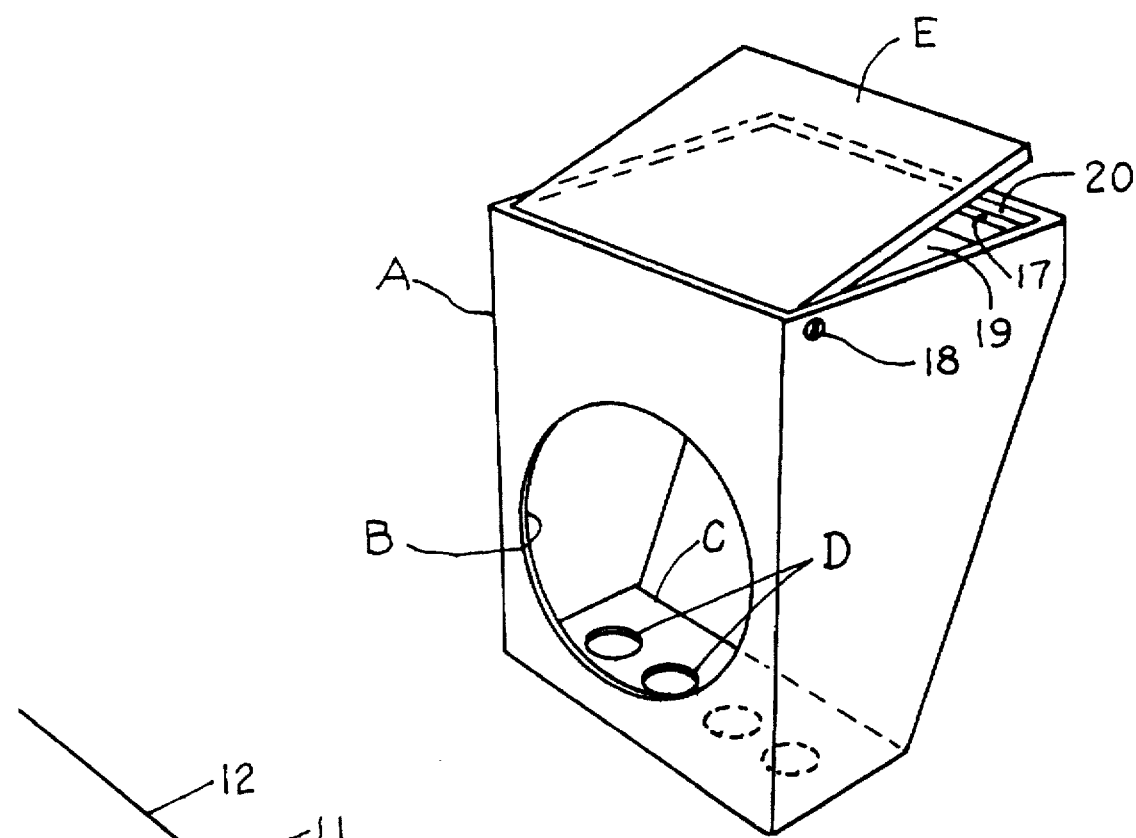
FIG. 8 is a perspective view of a modified form of the invention having upright sides one of which is inclined downwardly and inwardly forming a wedge-shaped box.
Figure 10:
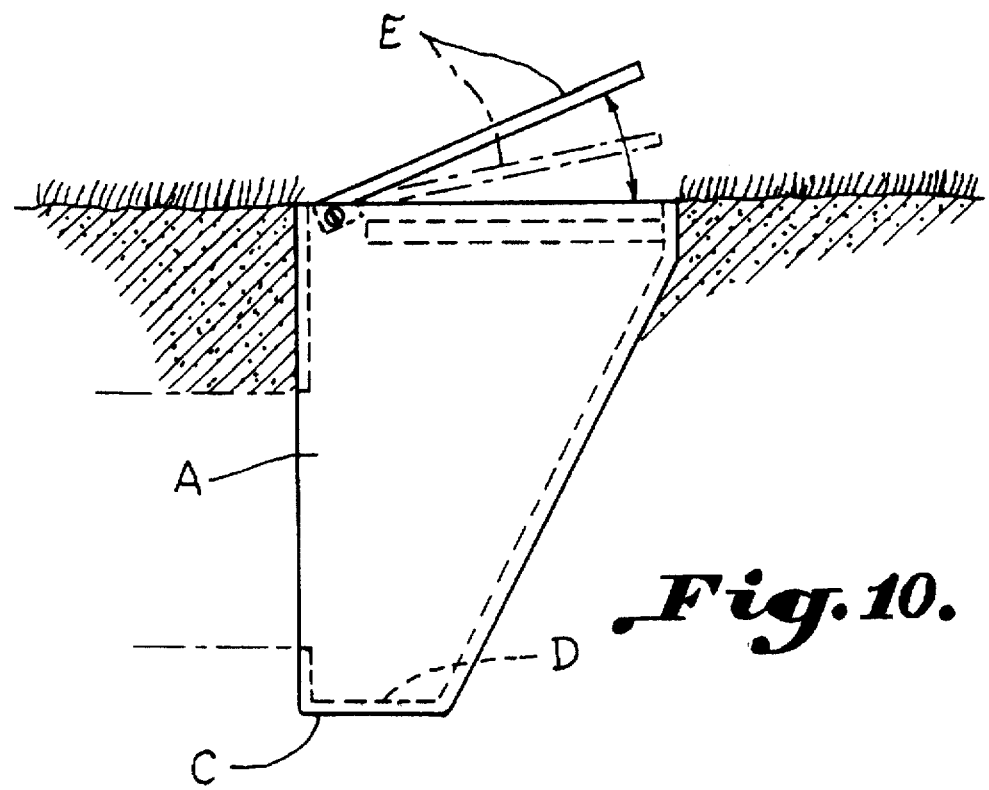
FIG. 10 is a transverse side elevation further illustrating the box in position even with the turf such as a grass lawn.

FIGS. 8, 9 and 10 illustrate another preferred embodiment of the invention wherein one of the upright sides A inclines downwardly and inwardly as illustrated as at 19 forming a generally wedge-shaped box. The imperforate cover E is pivoted as at 18 and is received within the open top which has a vertical wall member 20. The inwardly sloping wall 19 serves as a stop for bottom downward movement of the cover E.

In FIG. 10 the cover is illustrated as being pivoted upwardly in broken line intermediate position to release rainwater. The cover may be fully raised as shown for trash removal.

Figure 11:
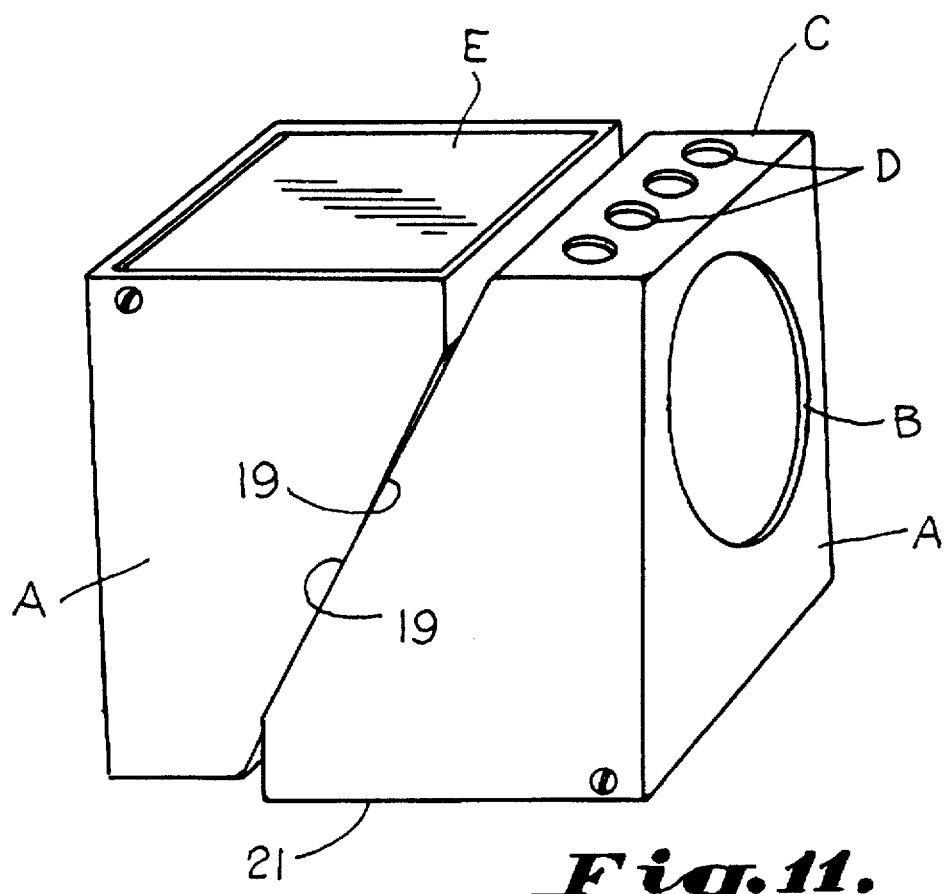
FIG. 11 is a perspective view illustrating a laterally stacked positioning of the wedge-shaped boxes for convenience in shipping.

FIG. 11 illustrates a stacked configuration for the wedge-shaped boxes of FIGS. 8, 9 and 10. The downwardly inclined sides are positioned in adjoining relation. One of the boxes is thus inverted with respect to the other. A suitable packaging material is illustrated by the broken lines 21 may be provided for packages of even multiples of boxes.

Figure 12:
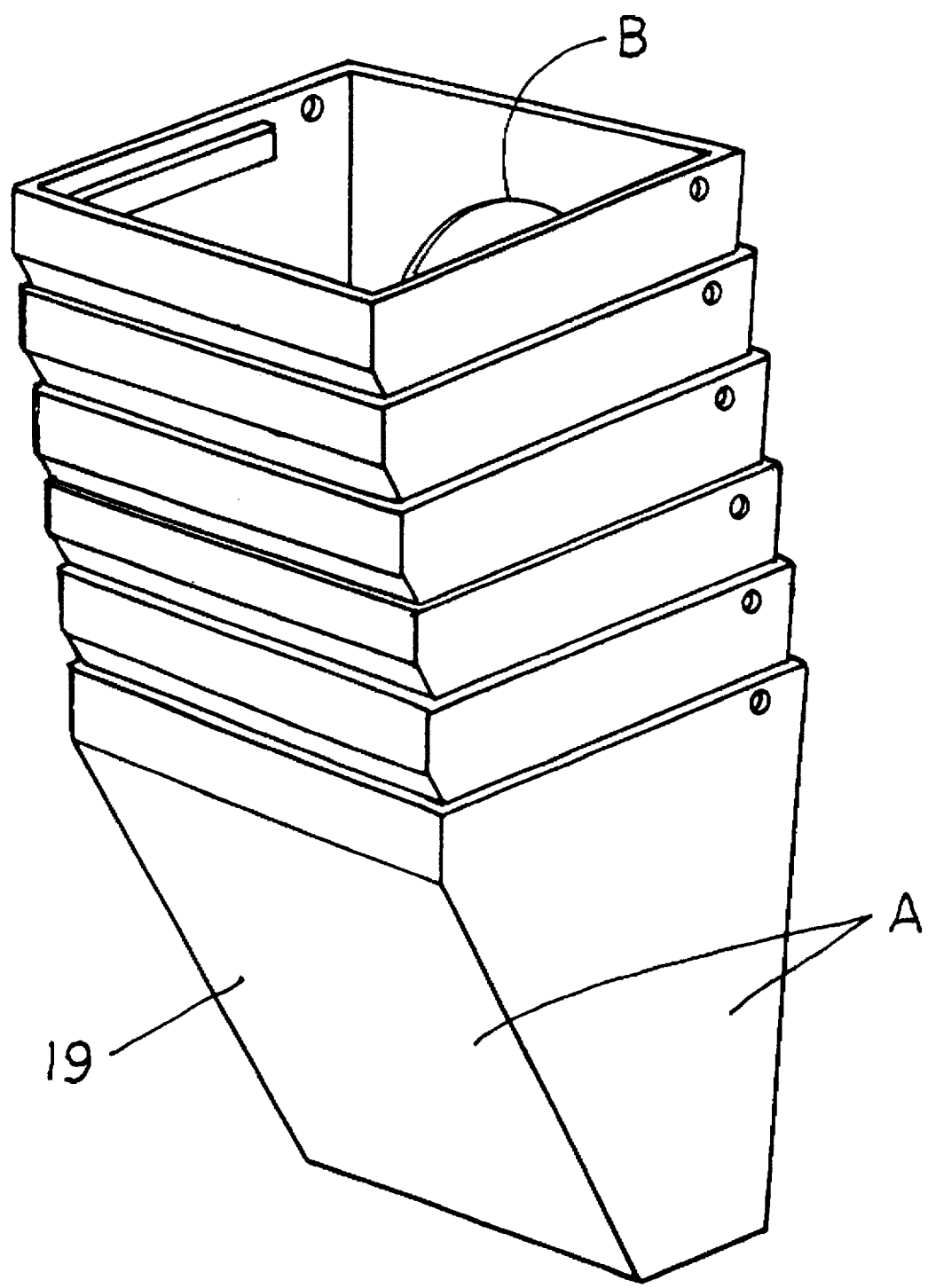
FIG. 12 is a perspective view illustrating the boxes in vertically stacked, nested position with the covers removed to facilitate stacking for shipment.

FIG. 12 illustrates a stacked and nested relationship for the boxes positioning the boxes in a package containing several stacked or nested boxes for shipment. Preferably, the sides taper slightly inwardly complementary to although of a lesser degree than the tapes of the inwardly tapering side portions 19 so that the boxes may be vertically nested for shipping.

It will be observed that a novel apparatus and method has been provided which is simple yet effective and easily installed. The tools which are needed to install the run-off pipes and boxes and related apparatus include a pick, shovel, wheel barrow and rake. Only one laborer is required with only one box needed as required. Four inch corrugated pipe is provided for each box and two cubic feet of gravel as providing a preferred configuration.

While a preferred embodiment of the invention has been described using specific terms, such description is for illustrative purposes only, and it is to be understood that changes and variations may be made without departing from the spirit or scope of the following claims.

What is claimed is:

1. The method of collecting and distributing water from a gutter on lawn turf comprising the steps of:

directing water underground in a lateral flow away from said gutter;

providing an upright box for receiving said water through an opening in a side of said box;

positioning the box providing an open top adjacent ground level;

reducing the velocity of said flow of water by collecting same in the box;

permitting water collected in the box to overflow substantially at ground level and spread gently over the area around the box;

providing a hinged cover at a top of the box for permitting upward pivotal opening of the cover at one end thereof when dictated by the water level in the box permitting said overflow; and draining water from a lower portion of said box avoiding accumulation of standing water;

whereby erosion is minimized and water may be conserved by irrigating the area around the box.

2. The method set forth in claim 1 including the step of placing gravel about said box for receiving and distributing water drained from the box after overflow to avoid standing water.

3. Apparatus for receiving and distributing rainwater from gutter downspouts utilizing a length of pipe suitable for attachment on one end to a downspout and for burial in the ground for carrying run-off water away from a building structure comprising:

a box having an upright side wall;

at least one entrance passageway connection in said side wall of said box for connecting a length of said pipe thereto for directing run-off water therein at high velocity;

a bottom in said box;

an open upper end of said box for positioning substantially at ground level permitting water collected in the box to flow upwardly and out of a top of the box when the box has collected sufficient water as to overflow over a surrounding area;

a cover for said open upper end of the box permitting water to overflow substantially at ground level;

a stop within said upper end of said box for positioning said cover substantially at ground level across said box;

an unobstructed, upwardly extending flow passageway in said box; and an opening communicating with a lower portion of said box for permitting water collected in the box to drain sufficiently to avoid retention of standing water in the box;

whereby erosion is minimized and run-off water may be utilized for irrigation.

4. The structure set forth in claim 3 wherein said opening is formed by a plurality of spaced holes adjacent said bottom.

5. The structure set forth in claim 4 wherein said holes are in side portions of the box adjacent the bottom.

6. The structure set forth in claim 4 wherein said cross-section above said connection is greater than a cross-section of said pipe for avoiding turbulence as run-off water rises in the box.

7. The structure set forth in claim 3 wherein said cover is pivoted to permit dislodgement facilitating overflow of the box.

8. The structure set forth in claim 3 wherein said cover is a foraminous grate.

9. The structure set forth in claim 3 and including multifaceted side walls and having at least one horizontal entrance passageway discharging water into said box.

10. The structure set forth in claim 9 including a plurality of entrance passageways.

11. A collection and distribution box for receiving and distributing rainwater from a gutter downspout through a length of pipe suitable for attachment on one end to a downspout and for burial in the ground for carrying run-off water away from a building structure comprising:

an upright side wall;

at least one entrance passageway connection in said side wall of said box for connecting said length of said pipe thereto for directing run-off water therein at high velocity;

a bottom in said box;

an open upper end of said box for placement substantially at ground level for permitting water collected in the box to flow upwardly and out of a top of the box when the box has collected sufficient water as to overflow over a surrounding area;

an unobstructed upwardly extending passageway defined by said side wall for reducing turbulence and obstruction to upwardly rising rainwater and trash carried therewith; and a pivoted substantially imperforate cover on said open end raised at one end by water overflowing the box; a pivoted substantially imperforate cover on said open end raised at one end by water overflowing the box;

whereby erosion is minimized and run-off water may be utilized for irrigation.

12. The structure set forth in claim 11 including an opening adjacent said bottom for permitting drainage of said box to avoid standing water.

13. The structure set forth in claim 11 wherein said passageway above said connection has a cross-section greater than the cross-section of said pipe.

14. The structure set forth in claim 13 wherein a side wall portion opposite said connection inclines downwardly and inwardly.

15. The structure set forth in claim 14 an assembly of said boxes stacked in alternate upright and inverted nested relationship to each other.

16. The structure set forth in claim 14 wherein additional side wall portions taper downwardly and inwardly sufficiently to permit stacking.

\* \* \* \* \*